United States Patent [19]

Wardill

[11] Patent Number: 4,545,172
[45] Date of Patent: Oct. 8, 1985

[54] ENERGY ABSORBING STRUCTURE

[75] Inventor: Gordon A. Wardill, Cranfield, England

[73] Assignee: Ford Motor Company, Dearborn, Mich.

[21] Appl. No.: 414,259

[22] PCT Filed: Dec. 14, 1981

[86] PCT No.: PCT/GB81/00270
§ 371 Date: Aug. 9, 1982
§ 102(e) Date: Aug. 9, 1982

[87] PCT Pub. No.: WO82/02078
PCT Pub. Date: Jun. 24, 1982

[30] Foreign Application Priority Data

Dec. 12, 1980 [GB] United Kingdom ............... 8040041
Apr. 7, 1981 [GB] United Kingdom ............... 8110795
Jun. 3, 1981 [GB] United Kingdom ............... 8117069

[51] Int. Cl.⁴ .................. B62D 21/00; E04C 2/32
[52] U.S. Cl. .................. 52/795; 280/784; 296/189; 52/728
[58] Field of Search .......... 52/795, 799, 800, 728; 280/784; 293/120, 132; 296/189; 428/186, 12, 595; 108/51.3, 51.1; 5/247, 255

[56] References Cited
U.S. PATENT DOCUMENTS

| 164,566 | 6/1875 | Kissam | 52/801 |
| 1,618,476 | 2/1927 | Rick | 52/801 |
| 2,493,562 | 1/1950 | Yarman | 108/51.3 |
| 3,466,733 | 9/1969 | Pajak | 29/455 |
| 3,482,367 | 12/1969 | Curran | 52/795 |
| 3,831,997 | 8/1974 | Myers | 280/784 |
| 4,227,593 | 10/1980 | Bricmont . | |

FOREIGN PATENT DOCUMENTS

| 0562919 | 9/1958 | Canada | 52/795 |
| 2315039 | 1/1977 | France | 293/120 |
| 498520 | 9/1954 | Italy | 52/799 |
| 560176 | 4/1957 | Italy | 52/800 |
| 1433167 | 4/1976 | United Kingdom | 280/784 |
| 1489065 | 10/1977 | United Kingdom . | |

Primary Examiner—John E. Murtagh
Assistant Examiner—Kathryn Ford
Attorney, Agent, or Firm—Cifford L. Sadler; Daniel M. Stock

[57] ABSTRACT

An energy absorbing structure suitable for example of use in a motor vehicle body panel to absorb impact loads comprises a wall having a plurality of ridges extending in a longitudinal direction corresponding to the expected direction of an applied load, and at least one reinforcement secured to the wall on adjacent ridges. The dimensions of the ridges and the points at which the reinforcement is secured are so arranged that the wall undergoes progressive collapse under impact in the longitudinal direction.

9 Claims, 13 Drawing Figures

ENERGY ABSORBING STRUCTURE

DESCRIPTION

This invention relates to energy absorbing structures.

Energy absorbing structures are used in assemblies which are susceptible to impact loads to control the amount of damage suffered by the assembly or to protect the occupants or contents thereof. For example energy absorbing structures are incorporated in motor vehicles to absorb impact energy and thereby reduce the risk of injury to passengers; in containers for cargo to protect the cargo from damage by impact loads; and in air landing pallets to absorb ground impact loads when the pallet has been dropped from an aircraft, thereby protecting the load carried by the pallet.

In a paper presented by Porsche at the 8th International Technical Conference on Experimental Safety Vehicles in Wolfsburg in October 1980 there is disclosed a vehicle body panel supporting a front road wheel suspension assembly and incorporating two plane parallel tubes arranged longitudinally of the vehicle. The tubes collapse under longitudinal impact loads thereby absorbing the energy of the impact load and reducing the amount of damage suffered by the rest of the vehicle.

We have observed that in energy absorbing structures which include a wall which is designed to buckle or fold under impact loads, thereby absorbing energy, the buckling or folding usually proceeds in a relatively uncontrolled manner, particularly where the wall is not in the form of a tube. For example the wall may form an initial fold which then acts as a hinge around which the whole structure can then bend. After such large scale bending of the structure has started to occur the structure offers little resistance to the applied load and the amount of additional energy absorbed by the structure is relatively small.

According to the present invention there is provided an energy absorbing structure comprising a wall having a plurality of ridges extending in longitudinal direction, and at least one reinforcement secured to the wall on or adjacent each ridge at one or more points along the length of the wall. By providing appropriate spacing between the said points and the ends of the wall and by choosing appropriate dimensions for the ridges, the structure undergoes a progressive collapse, without bending, when a load is applied in the horizontal direction.

The precise spacing of the points at which the or each reinforcement is secured to the wall in relation to the ends of the wall, and the precise dimensions of the ridges used will depend upon the material used for the wall, and the thickness and shape of the wall. However, the optimum spacing and the dimensions can easily be established by routine experiment.

The ridges may be formed by bending or moulding the sheet material of the wall, so that at least one ridge is formed by one or more folds of the longitudinally extending U-shaped ridge. For example the ridges may be generally U-shaped or V-shaped.

Alternatively, a ridge may be formed by two mutually inclined surfaces each having a flange along one longitudinally extending edge, the flanges of the two surfaces being secured together in abutment with each other. It may be appropriate to use both these constructions in a single wall.

The wall of the structure may be of any shape. For example it may be tubular of alternatively it may be planar or curved. In general, however, the corrugations should extend along straight lines in the direction in which an impact load is expected to be applied. In one construction, which is particularly useful in the manufacture of structural members for motor vehicles, the wall has a square or rectangular cross-section.

The reinforcements may generally take the form of straps. Where the wall is tubular, the reinforcements may be in the form of a plate extending diametrically across the tube or, preferably, a tube coaxial with the wall and secured thereto along its length. The tube may lie outside, or preferably, within the tubular wall.

Any deformable material may be used for the wall. In some cases where only light impact loads are expected, a flexible plastics material may be used. Where heavier loads are expected however, a metal would be more suitable. Aluminium is a preferred metal in view of its light weight. Mild steel can however also be used.

The invention is especially suitable, but not exclusively so, for use in motor vehicle body panels. For example, the body panel may be in the form of a vehicle suspension mounting panel which in use is aligned in the fore- and -aft direction. In this case, the ridges also extend in the fore- and -aft direction so that the structure absorbs frontal impact loads. Alternatively, the body panel may comprise a motor vehicle floor pan, especially a rear seat support and the ridges extend in the transverse direction of the vehicle so that the structure absorbs side impact loads.

Embodiments of the invention will now be described, by way of example only, with reference to the accompanying drawings, in which.

Figure 1:
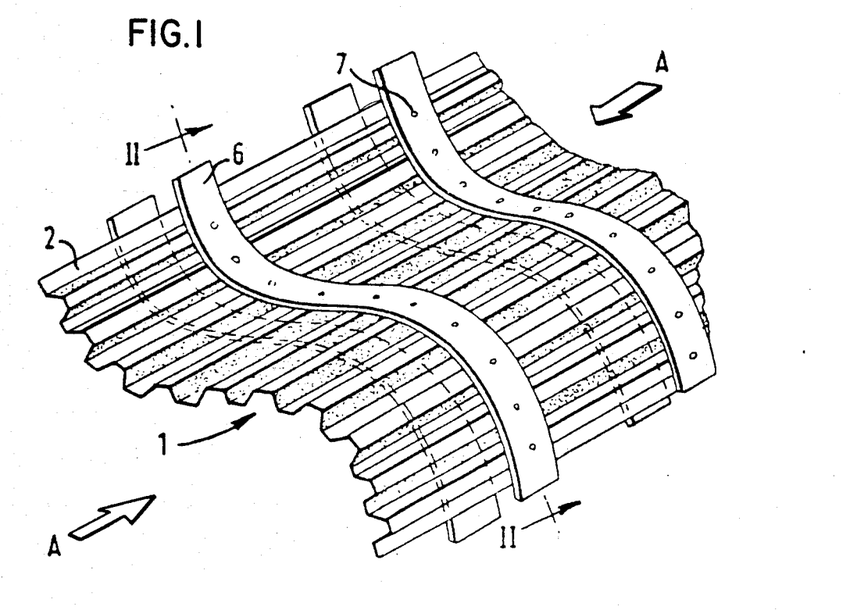
FIG. 1 is a perspective view of a first energy absorbing structure in accordance with the invention.
Figure 2:
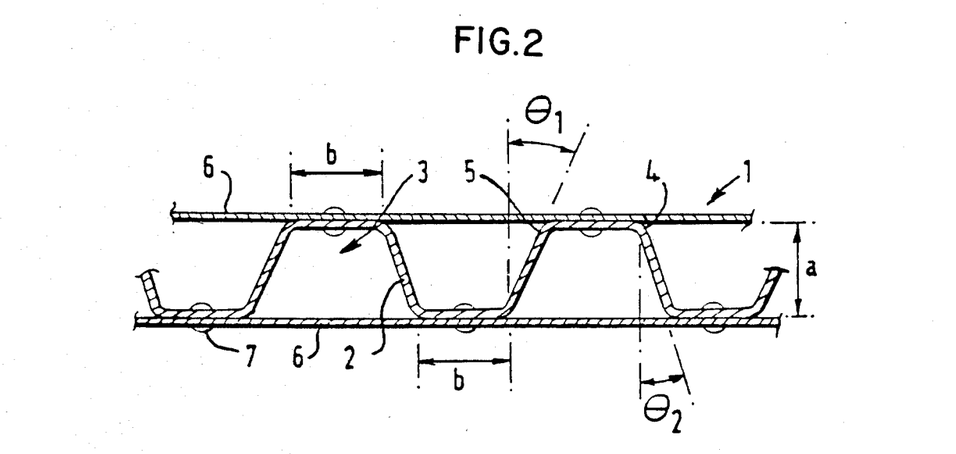
FIG. 2 is a partial cross section of the structure of FIG. 1 taken along line II—II.

Referring to FIGS. 1 and 2, an energy absorbing structure 1 comprises a wall 2 composed of a sheet metal such as aluminum. The sheet is formed with a plurality of ridges or corrugations 3 which extend parallel to each other in a longitudinal direction. The ridges may be formed by carrying out a series of bending operations on a flat blank of metal, or by pressing the flat blank between two dies.

As best illustrated in FIG. 2, the ridges are generally U-shaped with inclined side walls so that each ridge has two parallel fold lines 4,5 extending longitudinally along its length.

The wall 2 carries a set of spaced reinforcements in the form of straps 6 which are also made of aluminum. The straps extend transversely to the ridges and are fixed by means of rivets 7, at points adjacent to and on top of each ridge, the straps 6 being disposed in pairs opposite each other on either side of the wall. Alternatively, the straps may be secured to the wall by welding or by a suitable adhesive such as an epoxide resin. The structure may be shaped to any desired curvature in the transverse direction, provided that the ridges remain aligned along parallel straight lines.

If a longitudinal compressive load is applied to the structure in the direction of the arrows (FIG. 1), it is found that, provided that the points at which the straps 6 are secured to the wall 2 are properly spaced in relation to each other and the ends of the wall and that the ridges 3 are properly dimensioned, the structure collapses progressively from one end in the longitudinal direction.

The precise dimensions necessary to achieve this regular collapse will depend on the thickness and nature of the material from which the wall 3 is composed and are best determined by routine experiment. By way of example however, a structure in which the wall and straps are formed from 20 gauge aluminum sheet bent into the configuration shown in FIGS. 1 and 2, the distances a and b in FIG. 2 being both 20 mm, and and angles $\theta_1$ and $\theta_2$ being both 30°, and the straps are 2.5 cm wide and separated from each other and from the ends of the walls 3 by no more than 15 cm, has good collapse characteristics.

Figure 3:
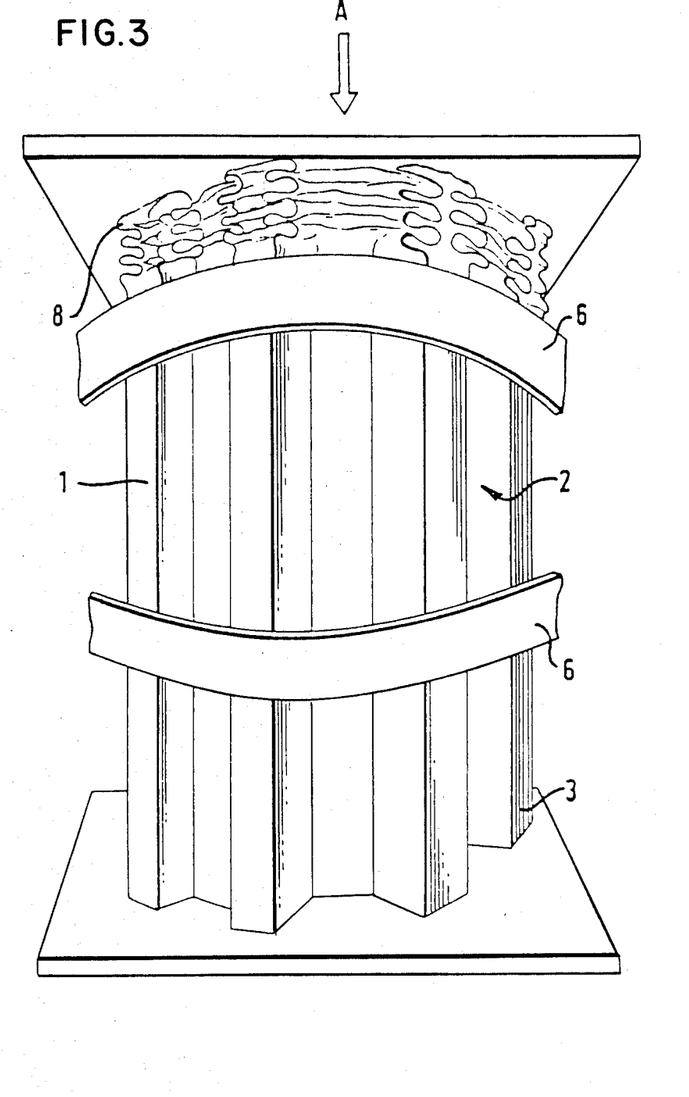
FIG. 3 is a perspective view of the structure of FIG. 1 and FIG. 2 under a load.

FIG. 3 illustrates the behaviour of such a structure under such a load. It can be seen that each ridge 3 folds into a large number of convolutions 8 while the structure 1 itself retains its generally longitudinal alignment without bending. Continued application of the load causes the folding to continue progressively along the structure past each of the straps 6 in turn. Since the formation of each successive fold in the wall requires additional energy, the total amount of energy absorbed by the structure is extremely high.

Figure 4:
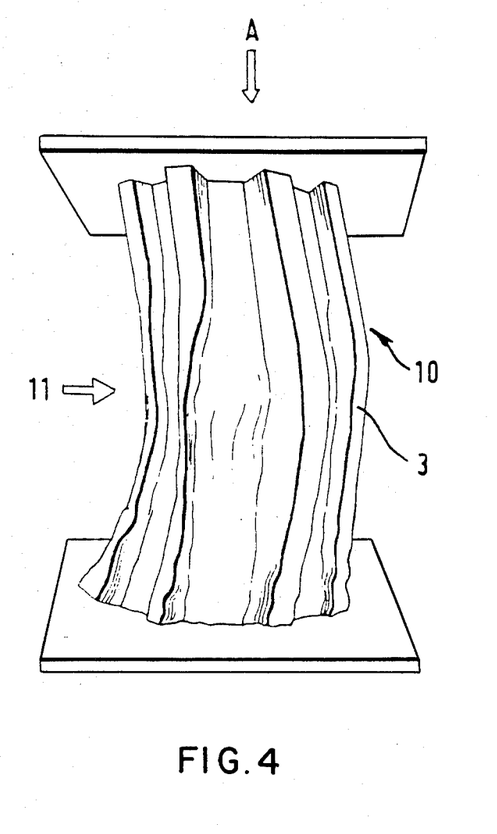
FIG. 4 is a perspective view of a structure not forming part of the present invention under a similar load to that illustrated in FIG. 3.

Referring now to FIG. 4, a structure 10 similar to that shown in FIG. 2 is illustrated after having been loaded in a manner similar to that described with reference to FIG. 3. Although the structure 10 has ridges 3 similar to the structure 2 of FIG. 2, it has no reinforcing straps 6. It can be seen that the application of a compressive load in the direction of the arrow A causes bending of the structure generally about a central pivot region 11. Once such bending has started the structure offers a much smaller resistance to the load and rapidly collapses in an uncontrolled manner. The total energy absorbed by the structure is therefore substantially less than that absorbed by the structure of the invention.

Figure 5:
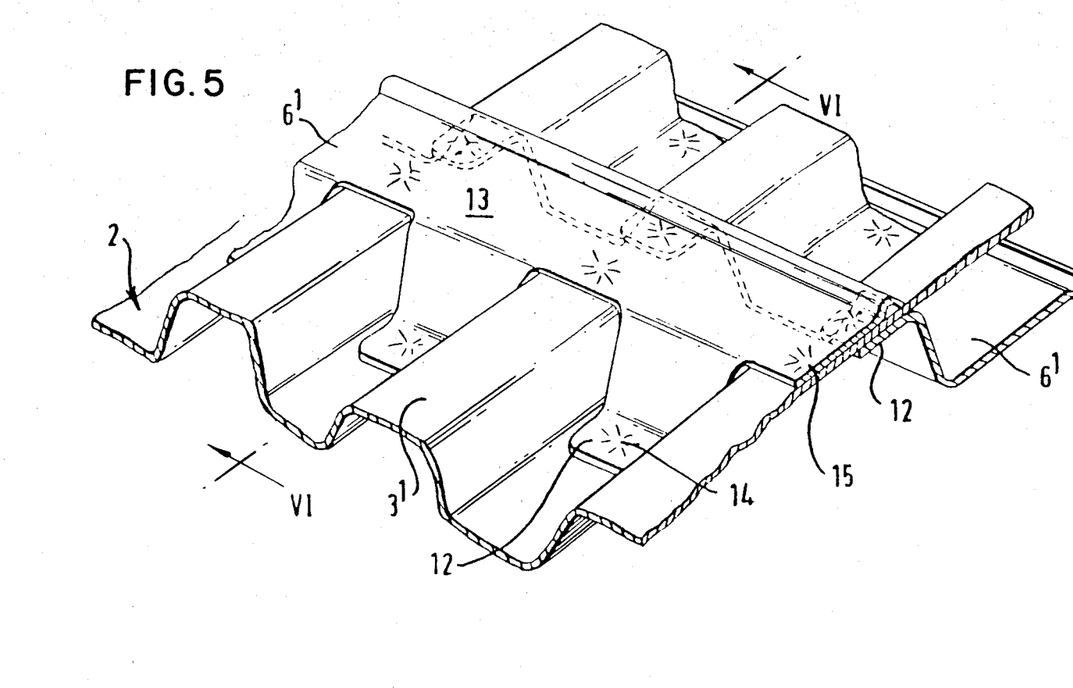
FIG. 5 is a perspective view of part of a second energy absorbing structure in accordance with the invention.
Figure 6:
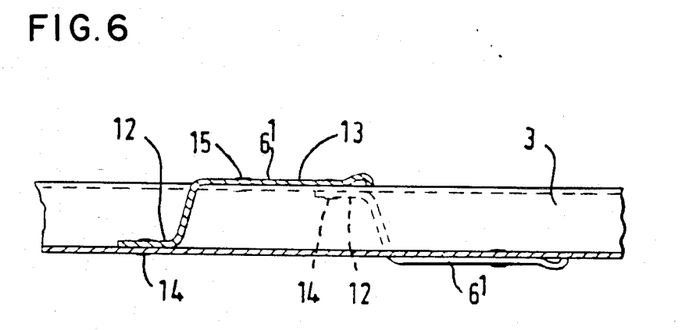
FIG. 6 is a partial cross-section of the structure of FIG. 3 taken along line VI—VI.

FIGS. 5 and 6 illustrate an alternative structure in accordance with the invention in which the ridges 3' are shaped similarly to that illustrated in FIGS. 1 and 2. The straps 6', 6' however are provided with tabs 12, 12 which project from the spine 13 of the straps 6' outwardly and downwardly into the channels between adjacent ridges 3'. The straps may then be secured to the wall at points adjacent to and on top of ridge 3' by riveting or welding at the ends of the tabs 12, as indicated at 14, and at the spine 13, as indicated at 15 in FIG. 6.

Figure 7:
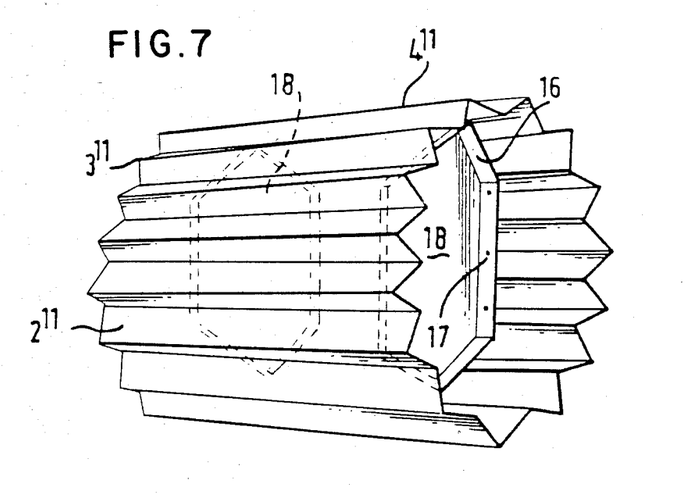
FIG. 7 is a perspective view of a third energy absorbing structure in accordance with the invention.
Figure 8:
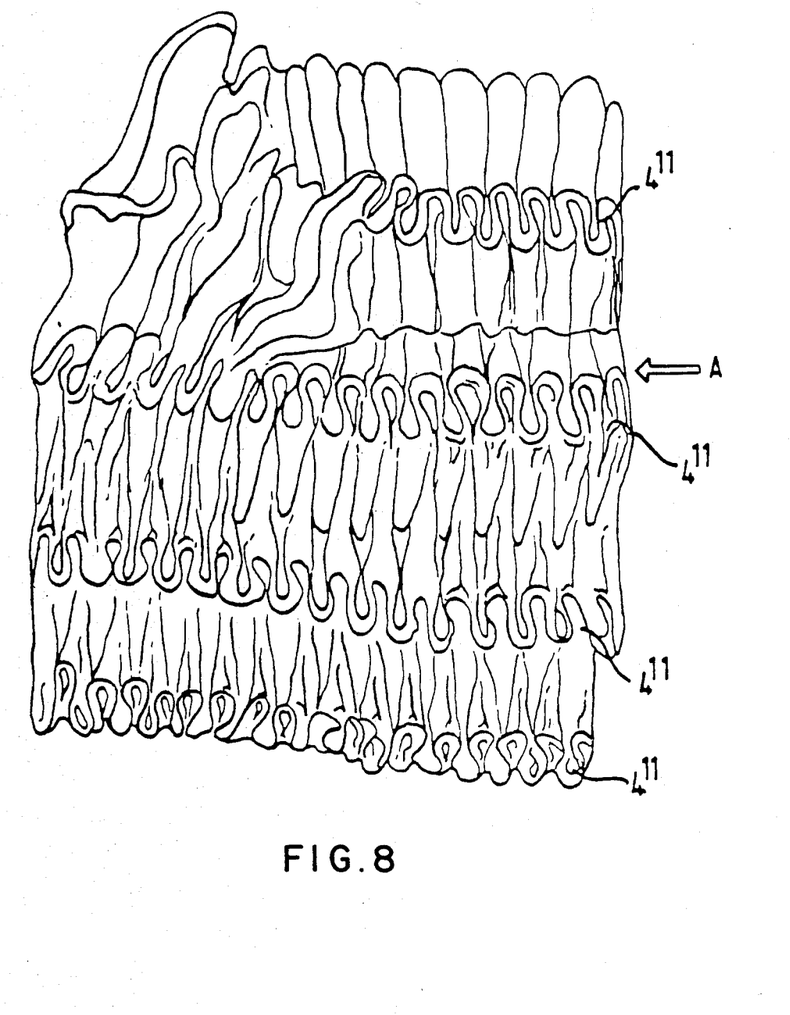
FIG. 8 is a perspective view of the structure of FIG. 7 after collapse under a load.

FIGS. 7 and 8 illustrate a further alternative embodiment of the invention, before and after collapse under load. In this structure, the wall 2" is tubular with V-shaped ridges 3" arranged axially. The reinforcements comprise hexagonal plates 18, 18 arranged dismetrically across the interior of the tubular wall. The plates each have upstanding flanges 16 which are riveted to the wall 2" between the ridges 3" as indicated at 17.

In this example, the tube is 15 cm in diameter, the reinforcements 18, 18 and the wall 2" are composed of 20 gauge aluminium plate, the ridges are formed with two 25 mm side walls inclined at 60° and the spacings between the two reinforcements and the ends of the tube are no greater than 15 cm.

FIG. 8 illustrates the tube after collapse. A compressive axial load in the direction of the arrow A of more than 58 kN is required to effect this collapse. As indicated in the drawings, the collapse occurs progressively in a controlled manner by the sequential formation of folds along the ridges 4" of the ridges 3".

Figure 9:
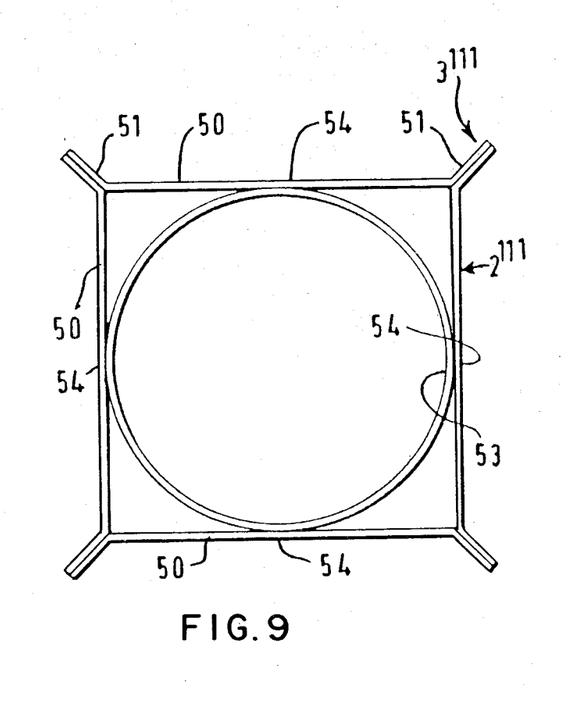
FIG. 9 is an end view of a fourth energy absorbing structure in accordance with the invention.
Figure 10:
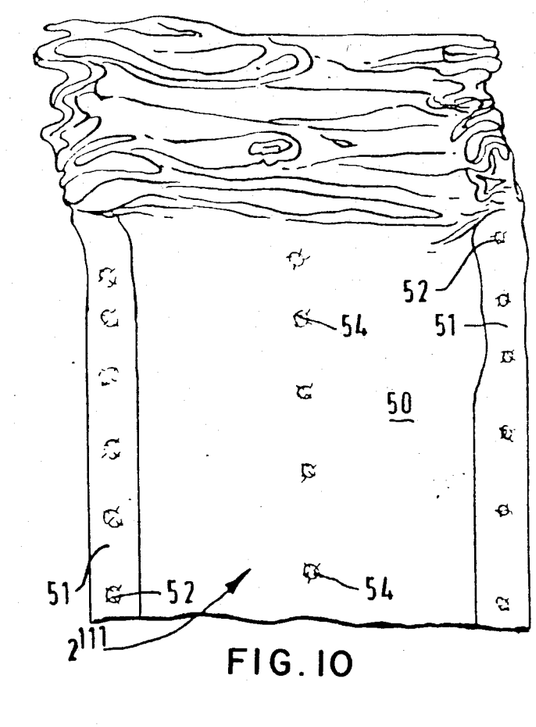
FIG. 10 is a side view of the structure of FIG. 9 after collapse under a load.

FIGS. 9 and 10 illustrate a third embodiment of the invention in which the wall 2''' is tubular with a square cross-sectional shape. The four sides of the tubular wall are formed from four separate plates 50 each of which is provided with a 45° flange 51 along its two longitudinally extending edges. The flanges of the adjacent plates 50 are secured together in abutment with each other by spot welding, as indicated at 52 in FIG. 10, so that the surfaces of adjacent pairs of plates 50 form the four V-shaped ridges 3''' along the length of the wall.

The reinforcement comprises a single cylindrical tube 53 positioned within the wall 2''' in contact with each of the four plates 50 and secured thereto adjacent each ridge 3''' by a series of spot welds 54 (FIG. 10) extending along the length of the wall 2'''. In this example the wall 2''' has an internal cross-sectional length of 8 cm, the wall 2''' and the reinforcement 53 are composed of 22 gauge mild steel and the spot welds 54 are spaced apart by no more than 3 cm in the longitudinal direction. As illustrated in FIG. 10 the structure has good collapse characteristics under loads applied in the direction of the ridges 3'''.

Figure 11:
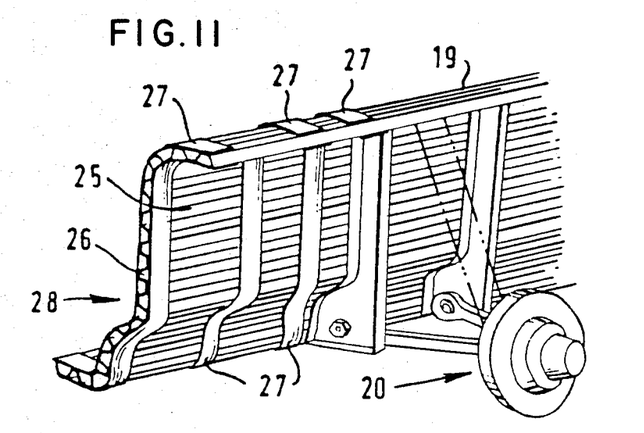
FIG. 11 is a perspective view of a first body panel of a motor vehicle incorporating a structure in accordance with the invention.
Figure 12:
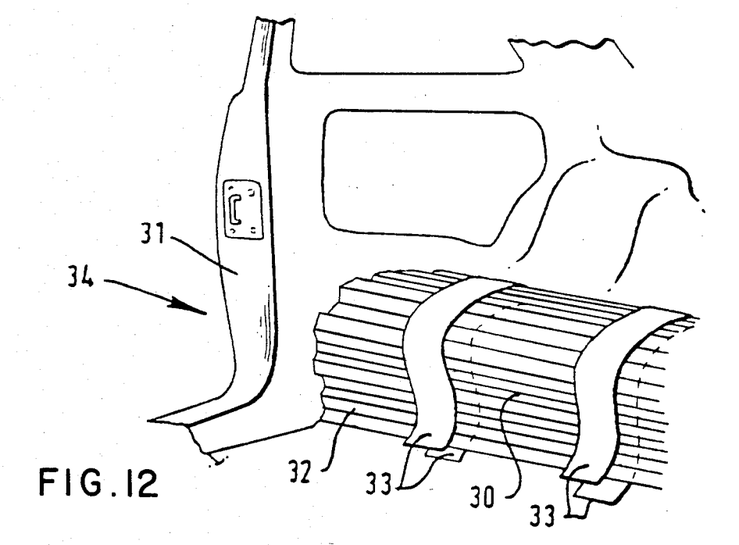
FIG. 12 is a perspective view of a second body panel of a motor vehicle incorporating a structure in accordance with the invention.

FIGS. 11 and 12 illustrate motor vehicle body panels incorporating energy absorbing structures in accordance with the invention. In FIG. 11 the panel 19 is a mounting for a road wheel suspension arm 20 illustrated on the fore- and -aft direction of the vehicle and the forward part of the panel includes a wall 25 having ridges 26 which are aligned parallel with the fore- and -aft direction. Straps 27 are secured to both faces of the wall 25 in the manner described with reference to FIGS. 1 and 2. By suitably shaping the corrugations and spacing the straps 27, the panel 19 will collapse in a controlled manner on application of a frontal force indicated by the arrow 28.

In FIG. 12 the panel 30 comprises a floor pan of a motor vehicle which is shaped to form the base of a rear seat in the vehicle adjacent a door aperture 31. The panel comprises ridges 32 which extend transversely of the vehicle and straps 33 secured to both faces of the panel and extending at right angles to the ridges. By suitably shaping the ridges and spacing straps 33, the panel will collapse in a controlled manner on application of a side load indicated by the arrow 34.

Figure 13:
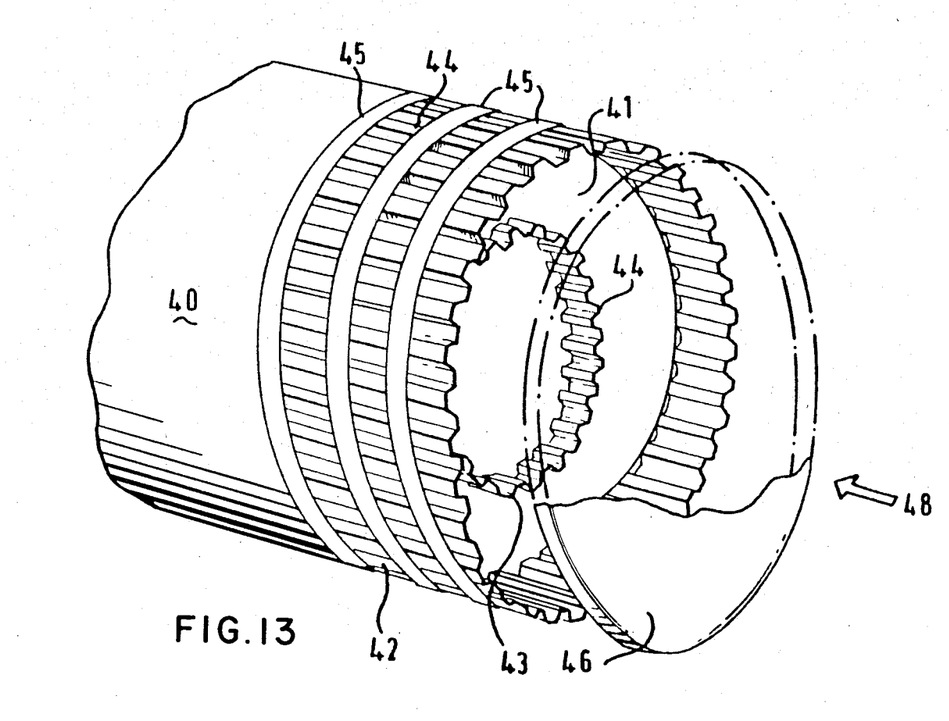
FIG. 13 is a perspective view of a container incorporating a structure in accordance with the invention.

FIG. 13 illustrates a container for a road or rail vehicle incorporating an energy absorbing structure in accordance with the invention. The container comprises a cylindrical tank 40 having a domed end 41 carrying two tubular structures 42, 43 in accordance with the invention mounted concentrically. Each structure 42, 43 comprises a set of axially extending ridges 44 and circumferential straps 45. An end plate 46 is mounted on the ends of the energy absorbing structures 42, 43. By shaping the ridges and spacing the straps 45 appropriately, the structures 42, 43 will collapse in a controlled manner on the application of an axial load in the direction indicated by the arrow 48, thereby protecting the tank 40 from damage.

Although the energy absorbing structures have been described in relation to road and rail vehicles it will be appreciated that the structures of the invention have many more possible uses.

I claim:

1. An energy absorbing structure comprising a wall having a plurality of parallel ridges extending in a longitudinal direction, and a plurality of spaced transversely extending reinforcement of longitudinal dimension substantially less than the extent of the wall secured to the wall on or adjacent to each ridge at one or more points along the length of the wall, the dimensions of the ridges and the spacing between the said points and the ends of the wall being such that the wall collapses progressively when a load is applied thereto in the longitudinal direction.

2. A structure according to claim 1 wherein the ridges each include at least one longitudinally extending fold line.

3. A structure according to claims 1 wherein at least one ridge is formed by one or more folds in the wall.

4. A structure according to claims 1 or 2, wherein the reinforcement comprises a strap.

5. A structure according to claims 1 or 2, wherein the wall is composed of aluminum.

6. A motor vehicle body panel incorporating a structure according to claim 1.

7. A body panel according to claim 6 in the form of a suspension mounting which in use generally in the fore- and -aft direction of the vehicle, the ridges extending in the fore- and -aft direction.

8. A body panel according to claim 6 in form of a floor pan which in use extends generally in the transverse direction of the vehicle, the ridges extending in the transverse direction.

9. An energy absorbing structure comprising a wall having a plurality of parallel ridges extending in a longitudinal direction, and a plurality of transversely extending spaced reinforcements of longitudinal dimension substantially less than the extent of the wall secured to the wall on or adjacent to each ridge at a plurality of points along the length of the wall, the dimensions of the ridges and the spacing between the said points and the ends of the wall being such that the wall collapses progressively when a load is applied thereto in the longitudinal direction.

* * * * *